March 20, 1934.  T. F. PATOCKA  1,951,768
CONTROL VALVE FOR FLUID SYSTEMS
Filed Oct. 22, 1928
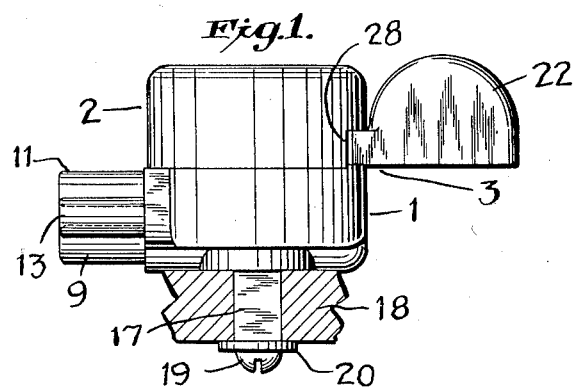
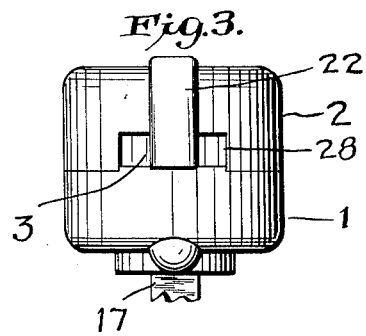
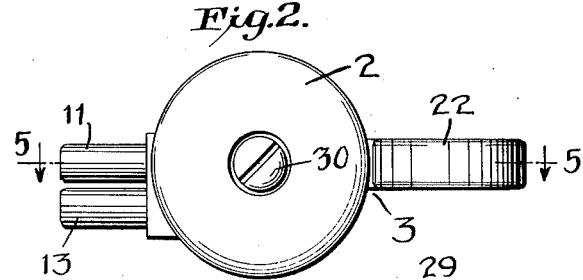
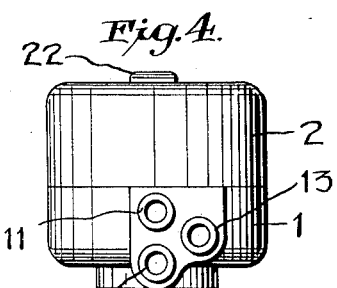
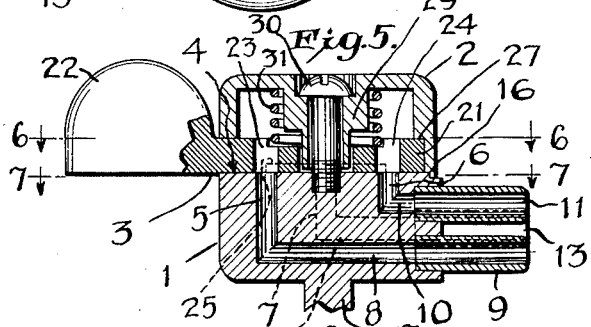
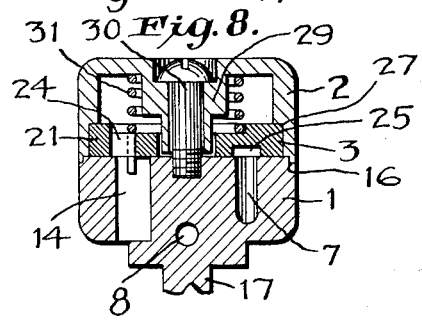
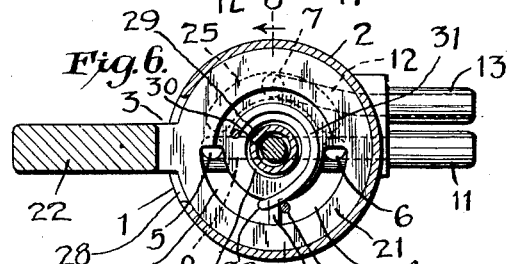
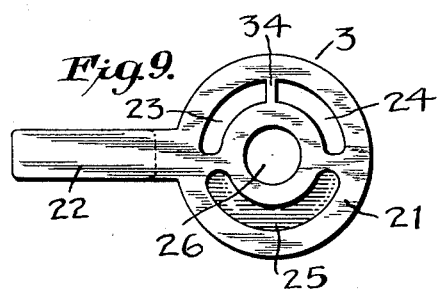
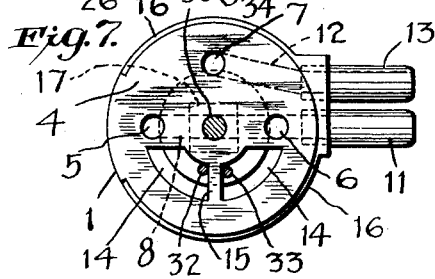
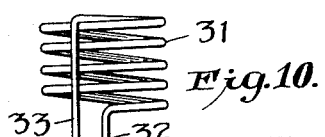
INVENTOR:
Theodor F. Patocka
BY Chas. M. C. Chapman
ATTORNEY Patented Mar. 20, 1934

1,951,768

UNITED STATES PATENT OFFICE 1,951,768

CONTROL VALVE FOR FLUID SYSTEMS

Theodore F. Patocka, College Point, N. Y., assignor to Thomas R. Brooks, Scranton, Pa.

Application October 22, 1928, Serial No. 314,029

2 Claims. (Cl. 251—149)

This invention relates to the art of fluid controlling valves, and particularly has reference to a valve adapted to control the flow of a fluid in a plurality of directions for the accomplishment of mechanical functions. My valve has many uses and its controlling means enables it to direct a fluid so as to operate various mechanical devices; but, I have applied the valve for the purpose of operating directional signals for motor vehicles and to control the power of the motor utilizable for the purpose of actuating directional signals such as the effects of suction or vacuum created in the motor during its operation.

The valve is automatically held normally in a closed position, that is, with the passage, leading from the source of fluid pressure, shut off and the two passages, leading to the members that are to be actuated, open to atmosphere. A slight pressure on the operating handle in either direction will allow the fluid to flow in that direction and, when the pressure is relieved, the valve will immediately return to the neutral or closed position.

In order that my invention may be clearly understood, I have provided a drawing wherein:

Figure 1 is a view showing my valve in side elevation applied to a given support shown in section;

Figure 2 is a top plan view;

Figure 3 is a view looking from the right of Figure 1;

Figure 4 is a view looking from the left of Figure 1;

Figure 5 is a sectional view taken on line 5—5 of Figure 2;

Figure 6 is a sectional plan view on line 6—6 of Figure 5;

Figure 7 is a sectional plan view on line 7—7 of Figure 5, this view being a plan view of the body member with the cover and valve members removed;

Figure 8 is a cross-sectional view on line 8—8 of Figure 6;

Figure 9 is a detail bottom plan view of the valve member; and

Figure 10 is a view in elevation of the spring which serves the double function of holding the valve member on its seat and causing the valve to normally remain in the neutral or closed position.

Referring to the drawing, the reference numeral 1 designates the valve body, 2 the cover and 3 the valve member. The valve body has a flat upper face 4 in which three downwardly extending passages 5, 6 and 7 are formed. The passage 5 communicates with a passage 8 extending at right-angles thereto and having a bushing 9 secured in its outer end. A connection (not shown) from this bushing 9 may lead to one of the members to be actuated by the fluid. A passage 10 at right-angles to the passage 6 communicates with the latter and has a similar bushing 11 secured in its outer end to which a connection may be secured to lead to the other fluid actuated member. The passage 7 communicates with a passage 12 at right-angles thereto, and this passage 12 has bushing 13 secured in its outer end, to which a connection may be secured leading from the source of fluid pressure.

Openings 14 lead from the face 4 to the atmosphere. The openings 14 are separated by a connecting piece 15, the purpose of which will be hereafter disclosed. The circumferential edge of the body is rabbeted at 16 to form a seat for the cover 2.

Projecting from the lower part of the body 1 is a squared extension 17 (see Figure 1) fitting into a corresponding hole in the spoke 18 of the wheel or part to which the valve is to be attached. A screw 19 and washer 20 hold the valve in position. Obviously, this method of attaching the valve might be widely varied.

The valve member 3, particularly illustrated in Figure 9, comprises a circular body 21 having a handle portion or thumb piece 22. Said valve member is provided with two arcuate openings 23 and 24 and an arcuate groove 25. It is further provided with a central opening 26 through which the securing means, hereinafter described, may pass. It will be noted from an inspection of Figure 6 that, in the normal or neutral position of the valve, the opening 5 in the body is in communication with the slot 23. In this manner both the openings 5 and 6 are exposed so as to freely relieve any fluid pressure that may have been stored up in the actuating members to which they may lead by the connections heretofore described. The arcuate groove 25, in the valve lies over the opening 7, and when the parts are in the neutral position as illustrated in Figure 6, the flat surfaces of the valve member and the body member are forced together and the fluid pressure entering the passage 12 cannot escape therefrom. When the valve is turned to the right or to the left, the arcuate groove 25 will connect either of the passages 5 or 6 with the passage 7, and the passage not being connected will be uncovered by one of the slots 23 or 24. In this way either of the passages 5 or 6 will be connected with the source of fluid pressure and the other opened to atmosphere.

The cover 2 has a shoulder 27 which rests on the edge of the valve member and maintains it in the proper position. An opening 28 is provided through which the thumb-piece 22 of the valve member extends and in which it is held centrally. The sides of this opening act as stops to limit the movement of the valve member. The lower edge of the cover is rabbeted to cooperate with the rabbet 16 on the body member.

The cover member has an inner central extension 29 through which passes a screw 30 which is tapped into the body portion and firmly secures the cover in position.

Means are provided for pressing the valve member against the upper flat face 4 of the body and at the same time automatically holding the valve in its neutral position. This means comprises a spring 31 particularly illustrated in Figure 10. The spring 31 has two legs 32 and 33 which extend downwardly and pass through the slots 23 and 24 and enter the slots 14 on opposite sides of the bridge piece 15. As shown in Figure 10, the spring is in a position it would assume when removed from the valve. In assembling the device, the leg 32 is passed through the slot 23 and into one of the slots 14, and the spring is slightly wound so that the other leg 33 passes through the slot 24 and into the other slot 14. The piece 34 between the slots 23 and 24 is thus held between the two legs 32 and 33 of the spring, and normally lies over the piece 15. As the valve is turned to the right or left, the part 34 moving one of the legs of the spring will cause it to be put under further tension and when the thumb piece is released the spring will immediately return the valve to neutral position with the piece 34 over the bridge piece 15. The spring, being confined between the top of the cover and the valve member, will act to press the valve member against the body member and prevent the escape of pressure.

From the foregoing it will be seen that my controlling valve consists of but five simple members, easily assembled, strong, durable and not likely to be put out of condition. The connection 13 to the exhaust of the engine of a motor vehicle is one method of operating the signal arms or other devices. Compressed air may be used. The fluid pressure or effects of vacuum can be utilized by directing it through one or the other of the passages 8 or 10 to activate signal arms or devices which may be carried by the vehicle, as on the sides of the wind shield. The controlling valve can be applied to any part of the vehicle desired. The thumb-piece is easily actuated by slight pressure or pull thereon.

Having thus described my invention, what I claim and desire to secure by Letters Patent is:

1. A controller for fluid systems consisting of a body member; a chambered cover therefor; a valve member confined between the two; and means for yieldingly holding the valve member in neutral position comprising a torsional spring having legs extending into engagement with the valve member, and also into engagement with the body member, and the body portion of said spring being located in the cover and bearing upon the valve member to hold the later frictionally in contact with the body member.

2. A controller for fluid systems comprising a body member, a valve member mounted thereon, a cover enclosing the valve and having a central circular perforated projection; means passing through said projection and into the body part to hold the three parts together; and a spring surrounding the projection and engaging the valve to impose tension thereon and force it against the body member, said spring having means for controlling the action of the valve and holding it in normal position.

THEODORE F. PATOCKA.